Jan. 27, 1970     F. A. E. PORSCHE     3,492,043

FLEXIBLE DIVIDED MOTOR VEHICLE TOP

Filed Feb. 26, 1968     3 Sheets-Sheet 1

Inventor:
FERDINAND ANTON ERNST PORSCHE
BY: Craig & Antonelli
ATTORNEYS

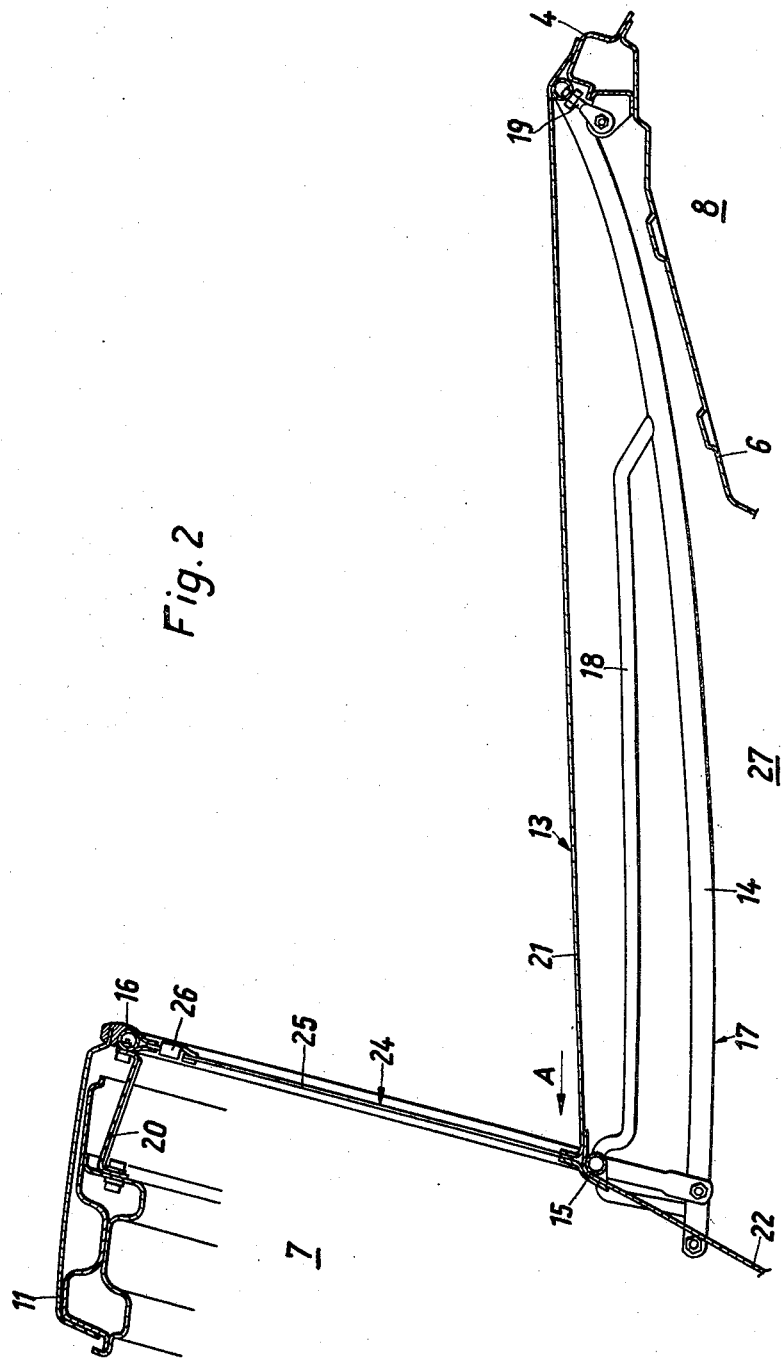

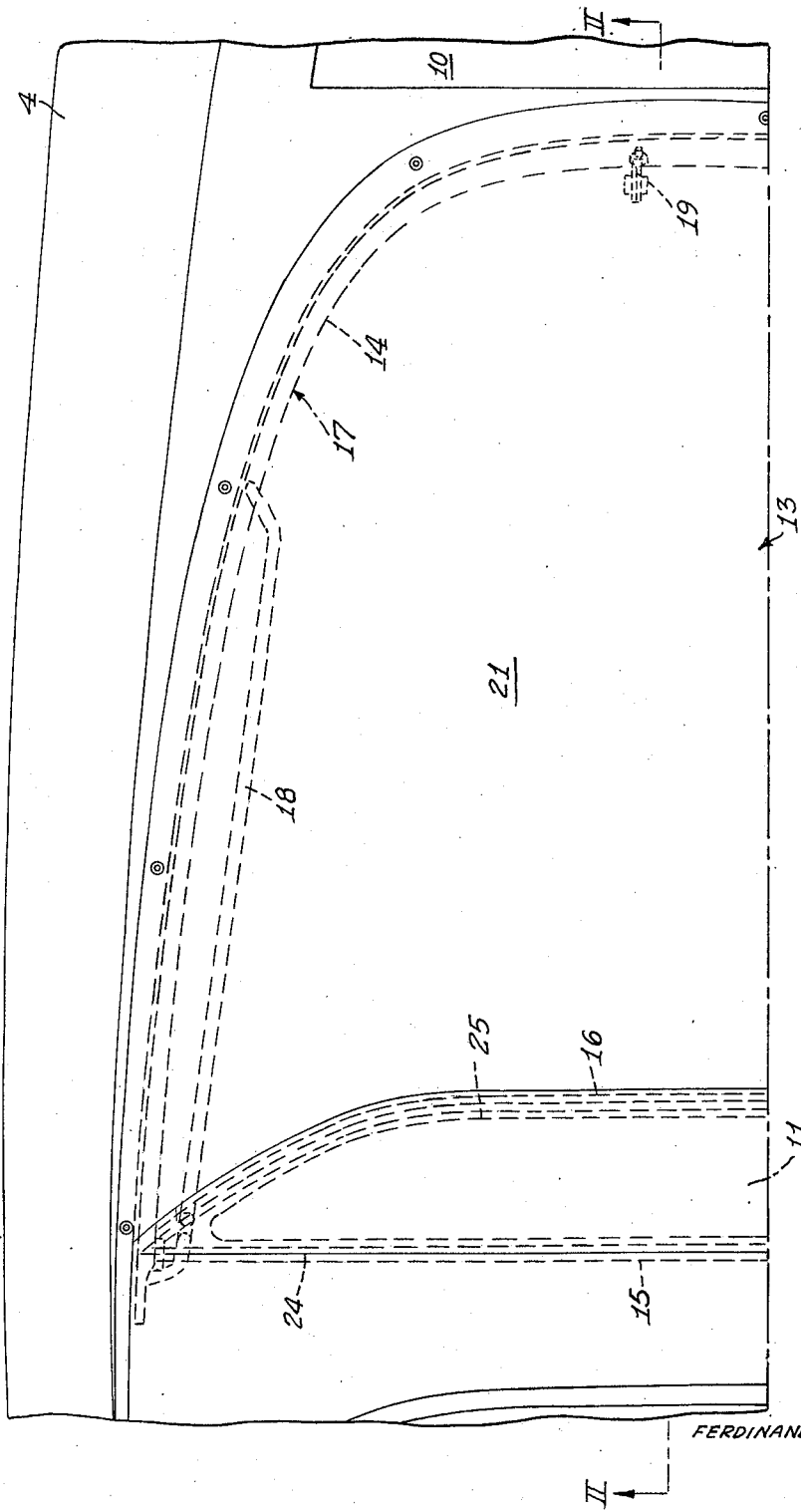

United States Patent Office 3,492,043
Patented Jan. 27, 1970

3,492,043
FLEXIBLE DIVIDED MOTOR VEHICLE TOP
Ferdinand Anton Ernst Porsche, Stuttgart-nord, Germany, assignor to Dr.-Ing. h.c.F. Porsche KG, Stuttgart-Zuffenhausen, Germany
Filed Feb. 26, 1968, Ser. No. 708,341
Claims priority, application Germany, Mar. 2, 1967, 1,630,906
Int. Cl. B60j 5/12, 7/12, 7/20
U.S. Cl. 296—137          12 Claims

ABSTRACT OF THE DISCLOSURE

A passenger motor vehicle having a roof consisting of a roll yoke, a passenger compartment roof forward of the roll yoke and a rear structure covering consisting of a slightly pliable sheet material combined with stable stiffeners rearward of the roll yoke, wherein the rear structure covering consists of a generally vertically disposed section and a generally horizontally disposed section that are each tensioned independently of the other. The vertically disposed section is provided with a flexible window connected thereto by means of a zipper on three sides. A rear storage compartment underneath the horizontally disposed section is covered by flexible covering extending downwardly from the common intersection of the vertically disposed and horizontally disposed sections.

BACKGROUND OF THE INVENTION

In the construction of motor vehicles, particularly passenger motor vehicles, there is a problem with respect to the tensioning of flexible roofs, particularly when a removable flexible rear window is employed.

SUMMARY OF THE INVENTION

It is an object of the present invention to improve the assembly and handling of rear structure coverings consisting of slightly pliable sheet material and stable reinforcements in combination with a roll yoke arching over the passenger compartment and a passenger compartment roof. Especially, it is an object to improve the tensioning of the rear covering when the rear window is opened.

According to the present invention, the covering of the rear structure consists of a horizontally disposed section and a vertically disposed section with stable reinforcements for each. With such a subdivision into two sections, the tensioning of each may be independent of the tensioning of the other. This is particularly advantageous with respect to the vertically disposed section, containing a rear window, not affecting the tension of the horizontally disposed section. Preferably, the vertically disposed section of the rear structure covering is arranged inside of the roll yoke and consists essentially of a windowpane having edges provided with elastic strips connected to the stable edge reinforcements by means of a zipper along the two side vertical edges and along the upper transverse edge of the pane. The lower transverse edge of the rear windowpane is connected to stable reinforcements so that the windowpane may be provided over an arbitrarily selected area of the vertically disposed section without affecting the tension of the horizontally disposed section when it is opened. This feature is especially advantageous with respect to sports cars, because fluttering of the rear structure covering will not occur. Additionally, a large windowpane may be provided to allow the optimum view toward the rear.

The horizontally disposed section of the rear structure covering is supported at its edges by means of stable reinforcements so that it may assume a favorable shape and additionally be tensioned by actuation of these reinforcements. The horizontally disposed section is held independently in its tensioned condition by means of adhering straps attached thereto and to the stable reinforcement that is common to the vertically disposed section.

BRIEF DESCRIPTION OF THE DRAWING

Further objects, features and advantages of the present invention will become more clear from the following description of the drawing, wherein:

FIGURE 2 is a partial longitudinal cross sectional view through the rear structure covering of the passenger motor vehicle taken along line II—II of FIGURE 4, including some adjacent portions of the vehicle body.

FIGURE 4 is a partial plan view of the rear of a passenger motor vehicle employing the roof structure according to the present invention.

DETAILED DESCRIPTION OF THE DRAWING

Figure 1:
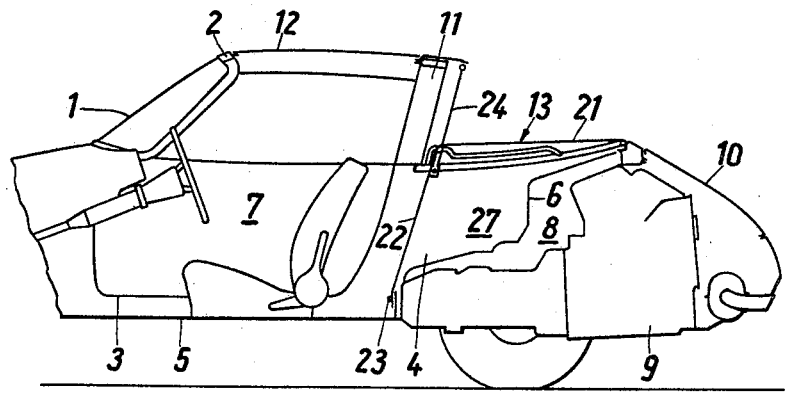
FIGURE 1 is a somewhat schematic partial longitudinal cross sectional view through a passenger motor vehicle employing the roof structure according to the present invention.

As shown in FIGURE 1, the pasesnger motor vehicle includes a windshield 1 held to the body by means of a windshield frame 2, a rear structure 4 and a floor 5. The floor 5 extends into the vehicle rear structure by means of the sheet metal stamping 6 which forms a partition between the passenger compartment 7 and the engine compartment 8 wherein there is disposed the usual engine components 9. The engine compartment 8 is accessible from the outside by means of a suitable cover 10. A roll yoke 11 is secured to the rear structure 4 and arches over the passenger compartment 7 for protection of the passengers. A passenger compartment roof section 12 is provided between the windshield frame 2 and the roll yoke 11, which roof section 12 may be removably connected to be completely removed without difficulty by the passengers.

A rear structure covering 13 extends rearwardly from the roll yoke 11 and covers the rear structure 4. The rear structure covering 13, the roll yoke 11 and the passenger compartment roof section 12 constitute the vehicle roof. The rear structure covering 13 consists of a pliable, watertight material connected to a stable reinforcement frame 17 consisting essentially of frame links 14, 15 and 16. Additional frame components or links 18 are actuatable to tension the pliable material and to simultaneously determine the closed form of the cover. The frame 17 is removably and to a certain extent adjustably connected to the rear structure 4 and the roll yoke 11 by fastening means 19, 20.

The rear structure covering 13 includes a horizontally disposed section 21 and a vertically disposed section 24. A slanted covering 22 forms an extension of the horizontally disposed section 21 and depends downwardly to the floor 5 where it is fastened to the stamping 6 by releasable means 23. The slanting cover 22 forms a removable cover for the rear storage space above the stamping 6. The vertically disposed section 24 is within the roll yoke 11 and consists essentially of a windowpane 25 made of a flexible elastic transparent material bound at its edges by elastic strips, and stable reinforcements. A zipper 26 is associated with the elastic strips and extends along the upper transverse edge and both side vertical edges of the windowpane 25. When the window 25 is opened by actuation of the zipper 26, the windowpane 25 may be either lowered onto the horizontally disposed section 21 or the slanting covering 22.

Figure 3:
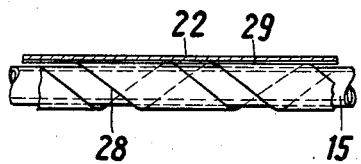
FIGURE 3 is a partial view in the direction of the arrow "A" in FIGURE 2, on an enlarged scale.

In order to prevent reduction in the tensioning of the rear structure covering sections 21 and 24 when the fastening means 23 is released to allow displacement of the slanting cover 22 to reach the rear storage space 27, the frame portion 15 is wrapped with an adhering strap 28 (FIGURE 3) which operatively cooperates with an adhering strap 29 fastened to the rear structure covering 13.

The single preferred embodiment of the present invention has been described in detail for purposes of illustration; further modification, variations and embodiments are contemplated within the spirit and scope of the present invention as defined by the above disclosure.

I claim:

1. A roof for a motor vehicle, especially a passenger motor vehicle, consisting of a plurality of sections, one of which is constructed as a roll yoke arching over the passenger compartment onto which is detachably attached a passenger compartment roof and a rear structure covering consisting of a slightly pliable sheet material combined with stable reinforcements, where the improvement essentially comprises the rear structure covering being composed of a generally vertically disposed section enclosing the area defined by said roll yoke and a generally horizontally disposed section being disposed substantially at the level of the top of the rear structure of the motor vehicle and forming a cover for the rear structure.

2. The roof according to claim 1, wherein the vertically disposed section of the rear structure covering is mounted inside the roll yoke.

3. The roof according to claim 2, wherein the vertically disposed section of the rear structure covering consists essentially of a windowpane having edges provided with strips of elastic material, and stable reinforcements with means connected to said strips of the edges.

4. The roof according to claim 3, wherein said last-mentioned means includes a zipper along the two side vertical edges and along the upper transverse edge of the pane.

5. The roof according to claim 1, wherein the stable reinforcements of the horizontally disposed section of the rear structure covering include means actuatable to tension the associated pliable sheet covering.

6. The roof according to claim 5, wherein said stable reinforcements hold said horizontally disposed section of the rear structure covering tensioned independently of tensioning of said vertically disposed section.

7. The roof according to claim 1, wherein the stable reinforcements for said vertically disposed section hold its pliable sheet material in tensioned condition independently of tensioning of said horizontally disposed section.

8. The roof according to claim 1, wherein the stable reinforcements for said horizontally disposed section hold the associated pliable sheet material of the horizontally disposed section tensioned independently of tension in said vertically disposed section.

9. The roof according to claim 1, in combination with a vehicle including a floor, a storage compartment rearwardly of the passenger compartment and a flexible sheet material partition separating the passenger compartment from the rearward storage compartment; said vertically disposed section and said horizontally disposed section having a common stable reinforcement at their adjacent edges; said partition being connected securely at one end to said common stable reinforcement and at its opposite end to the vehicle frame adjacent the floor.

10. The roof according to claim 1, wherein said vertically disposed section and said horizontally disposed section have their adjacent edges connected to a common elongated transversely extending stable reinforcement by means of an adhering strap wrapped around said common stable reinforcement and attached to said horizontally disposed section and said vertically disposed section.

11. The roof according to claim 1, wherein the vertically disposed section of the rear structure covering consists essentially of a windowpane having edges provided with strips of elastic material, and stable reinforcements with means connected to said strips of the edges.

12. The roof according to claim 11, wherein said last-mentioned means includes a zipper along the two side vertical edges and along the upper transverse edge of the pane.

References Cited

UNITED STATES PATENTS

| 1,924,030 | 8/1933 | Elser | 296—99 |
| 1,944,053 | 1/1934 | Zied | 296—99 |
| 3,169,792 | 2/1965 | Solano | 296—99 |
| 3,366,414 | 1/1968 | Thompson | 296—100 |

FOREIGN PATENTS

| 473,639 | 2/1929 | Germany. |

LEO FRIAGLIA, Primary Examiner

ROBERT R. SONG, Assistant Examiner

U.S. Cl. X.R.

296—136